(12) United States Patent
Bostanjoglo et al.

(10) Patent No.: US 9,435,222 B2
(45) Date of Patent: *Sep. 6, 2016

(54) LAYER SYSTEM HAVING A TWO-PLY METAL LAYER

(75) Inventors: Georg Bostanjoglo, Berlin (DE); Axel Kaiser, Neuss (DE); Werner Stamm, Mülheim an der Ruhr (DE); Jan Steinbach, Berlin (DE); Dimitrios Thomaidis, Berlin (DE)

(73) Assignee: SIEMENS AKTIENGESELLSCHAFT (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/131,572

(22) PCT Filed: Jul. 8, 2011

(86) PCT No.: PCT/EP2011/061655
§ 371 (c)(1),
(2), (4) Date: Mar. 5, 2014

(87) PCT Pub. No.: WO2013/007281
PCT Pub. Date: Jan. 17, 2013

(65) Prior Publication Data
US 2014/0234662 A1    Aug. 21, 2014

(51) Int. Cl.
*F01D 25/00* (2006.01)
*F01D 5/28* (2006.01)
(Continued)

(52) U.S. Cl.
CPC ........... *F01D 25/005* (2013.01); *B32B 15/043* (2013.01); *C22C 19/058* (2013.01);
(Continued)

(58) Field of Classification Search
CPC ............. B32B 15/01; B32B 2603/00; B32B 2311/22; B32B 2255/20; B32B 15/04; B32B 2255/06; B32B 33/00; B32B 2250/03; B32B 15/043; B32B 15/20; Y10T 428/12618; Y10T 428/12931; Y10T 428/12937; Y10T 428/12944; C22C 19/058; C22C 19/05; C22C 30/00; C22C 19/03; C22C 19/00; C23C 28/30; C23C 28/321; C23C 28/023; C23C 28/022; C23C 28/3215; C23C 30/00; C23C 30/005; C23C 4/085
USPC ........ 428/633, 678; 420/445, 446, 447, 455, 420/460
See application file for complete search history.

(56) References Cited

U.S. PATENT DOCUMENTS 4,005,989 A    2/1977  Preston
4,034,142 A    7/1977  Hecht
(Continued)

FOREIGN PATENT DOCUMENTS

CA    2 414 019 A1    6/2003
DE    32 11 583 A1    11/1982
(Continued)

OTHER PUBLICATIONS

International Search Report dated Oct. 14, 2011 issued in corresponding International patent application No. PCT/EP2011/061655.
(Continued)

*Primary Examiner* — Michael E La Villa
(74) *Attorney, Agent, or Firm* — Ostrolenk Faber LLP (57) ABSTRACT

Known protective layers having high Cr content and additional silicon form brittle phases, which additionally become brittle under the effect of carbon during use. The protective layer according to the invention comprises a two-part metal layer, which contains tantalum on the outside.

30 Claims, 4 Drawing Sheets

(51) Int. Cl.
*B32B 15/01* (2006.01)
*B32B 15/04* (2006.01)
*B32B 15/20* (2006.01)
*C23C 28/00* (2006.01)
*C23C 28/02* (2006.01)
*C23C 30/00* (2006.01)
*C22C 19/05* (2006.01)

(52) U.S. Cl.
CPC ........... *C23C28/022* (2013.01); *C23C 28/023* (2013.01); *C23C 28/30* (2013.01); *C23C 28/321* (2013.01); *C23C 28/3215* (2013.01); *C23C 30/00* (2013.01); *C23C 30/005* (2013.01); *F01D 5/288* (2013.01); *F01D 25/007* (2013.01); *F05D 2300/132* (2013.01); *F05D 2300/518* (2013.01); *F05D 2300/611* (2013.01); *Y10T 428/12618* (2015.01); *Y10T 428/12931* (2015.01); *Y10T 428/12937* (2015.01); *Y10T 428/12944* (2015.01)

(56) References Cited

U.S. PATENT DOCUMENTS

| | | | |
|---|---|---|---|
| 4,447,503 A | 5/1984 | Dardi et al. | |
| 6,001,492 A | 12/1999 | Jackson et al. | |
| 6,024,792 A | 2/2000 | Kurz et al. | 117/9 |
| 6,231,692 B1 | 5/2001 | Vogt et al. | 148/428 |
| 6,610,419 B1 | 8/2003 | Stamm | 428/632 |
| 7,005,015 B2 | 2/2006 | Bürgel et al. | 148/428 |
| 8,025,984 B2 | 9/2011 | Stamm | 428/678 |
| 8,420,238 B2 | 4/2013 | Kulkarni et al. | 428/701 |
| 2004/0011439 A1 | 1/2004 | Corrigan et al. | 148/555 |
| 2004/0180233 A1 | 9/2004 | Stamm | |
| 2007/0065675 A1 | 3/2007 | Stamm | 428/679 |
| 2008/0026242 A1* | 1/2008 | Quadakkers et al. | 428/551 |
| 2010/0009144 A1 | 1/2010 | Schumann et al. | 428/213 |
| 2010/0047063 A1 | 2/2010 | Kulkarni et al. | 415/177 |
| 2010/0136367 A1 | 6/2010 | Quadakkers et al. | |
| 2010/0143745 A1 | 6/2010 | Stamm | |

FOREIGN PATENT DOCUMENTS

| | | |
|---|---|---|
| EP | 0 892 090 A1 | 1/1999 |
| EP | 1 306 454 A1 | 5/2003 |
| EP | 1 319 729 A1 | 6/2003 |
| EP | 1 327 702 A1 | 7/2003 |
| EP | 1 204 776 B1 | 6/2004 |
| EP | 1 925 687 A1 | 5/2008 |
| EP | 1 939 315 A1 | 7/2008 |
| RU | 2 334 022 C2 | 9/2008 |
| RU | 2 388 845 C2 | 5/2010 |
| RU | 2 413 791 C2 | 3/2011 |
| WO | WO 91/01433 A1 | 2/1991 |
| WO | WO 99/67435 | 12/1999 |
| WO | WO 00/44949 | 8/2000 |
| WO | WO 2008/074371 A1 | 6/2008 |

OTHER PUBLICATIONS

Office Action dated Dec. 15, 2014 with English translation of Search Report in corresponding Chinese Patent Application No. 201180072189.X (12 pages).

Russian Federation Office Action issued May 20, 2015 in corresponding Russian Federation Application No. 2014104513/02(007189). Total 9 pages.

* cited by examiner

| Werkstoff | C | Cr | Ni | Co | Mo | W | Ta | Nb | Al | Ti | B | Zr | Hf |
|---|---|---|---|---|---|---|---|---|---|---|---|---|---|
| Ni-Basis-Feingußlegierungen | | | | | | | | | | | | | |
| GTD 222 | 0.10 | 22.5 | Rest | 19.0 | | 2.0 | 1.0 | | 1.2 | 2.3 | 0.008 | | |
| IN 939 | 0.15 | 22.4 | Rest | 19.0 | | 2.0 | 1.4 | 1.0 | 1.9 | 3.7 | 0.009 | 0.10 | |
| IN 6203 DS | 0.15 | 22.0 | Rest | 19.0 | | 2.0 | 1.1 | 0.8 | 2.3 | 3.5 | 0.010 | 0.10 | 0.75 |
| Udimet 500 | 0.10 | 18.0 | Rest | 18.5 | 4.0 | | | | 2.9 | 2.9 | 0.006 | 0.05 | |
| IN 738 LC | 0.10 | 16.0 | Rest | 8.5 | 1.7 | 2.6 | 1.7 | 0.9 | 3.4 | 3.4 | 0.010 | 0.10 | |
| SC 16 | <.01 | 16.0 | Rest | | 3.0 | | 3.5 | | 3.5 | 3.5 | <.005 | <.008 | |
| Rene 80 | 0.17 | 14.0 | Rest | 9.5 | 4.0 | 4.0 | | | 3.0 | 5.0 | 0.015 | 0.03 | |
| GTD 111 | 0.10 | 14.0 | Rest | 9.5 | 1.5 | 3.8 | 2.8 | | 3.0 | 4.9 | 0.012 | 0.03 | |
| GTD 111 DS | | | | | | | | | | | | | |
| IN 792 CC | 0.08 | 12.5 | Rest | 9.0 | 1.9 | 4.1 | 4.1 | | 3.4 | 3.8 | 0.015 | 0.02 | 1.00 |
| IN 792 DS | 0.08 | 12.5 | Rest | 9.0 | 1.9 | 4.1 | 4.1 | | 3.4 | 3.8 | 0.015 | 0.02 | 1.00 |
| MAR M 002 | 0.15 | 9.0 | Rest | 10.0 | | 10.0 | 2.5 | | 5.5 | 1.5 | 0.015 | 0.05 | 1.50 |
| MAR M 247 LC DS | 0.07 | 8.1 | Rest | 9.2 | 0.5 | 9.5 | 3.2 | | 5.6 | 0.7 | 0.015 | 0.02 | 1.40 |
| CMSX-2 | <.006 | 8.0 | Rest | 4.6 | 0.6 | 8.0 | 6.0 | | 5.6 | 1.0 | <.003 | <.0075 | 0.10 |
| CMSX-3 | <.006 | 8.0 | Rest | 4.6 | 0.6 | 8.0 | 6.0 | | 5.6 | 1.0 | <.003 | <.0075 | 0.10 |
| CMSX-4 | | 6.0 | Rest | 10.0 | 0.6 | 6.0 | 6.0 | | 5.6 | 1.0 | | Re=3.0 | |
| CMSX-6 | <.015 | 10.0 | Rest | 5.0 | 3.0 | <.10 | 2.0 | <.10 | 4.9 | 4.8 | <.003 | <.0075 | 0.10 |
| PWA 1480 SX | <.006 | 10.0 | Rest | 5.0 | | 4.0 | 12.0 | | 5.0 | 1.5 | <.0075 | <.0075 | |
| PWA 1483 SX | 0.07 | 12.2 | Rest | 9.0 | 1.9 | 3.8 | 5.0 | | 3.6 | 4.2 | 0.0001 | 0.002 | |
| Co-Basis-Feingußlegierungen | | | | | | | | | | | | | |
| FSX 414 | 0.25 | 29.0 | 10 | Rest | | 7.5 | | | | | 0.010 | | |
| X 45 | 0.25 | 25.0 | 10 | Rest | | 8.0 | | | | | 0.010 | | |
| ECY 768 | 0.65 | 24.0 | 10 | 51.7 | | 7.5 | 4.0 | | 0.25 | 0.3 | 0.010 | 0.05 | |
| MAR-M-509 | 0.65 | 24.5 | 11 | Rest | | 7.5 | 4 | | | 0.3 | 0.010 | 0.60 | |
| CM 247 | 0.07 | 8.3 | Rest | 10.0 | 0.5 | 9.5 | 3.2 | | 5.5 | 0.7 | | | 1.5 | chemische Zusammensetzung in %

LAYER SYSTEM HAVING A TWO-PLY METAL LAYER

CROSS-REFERENCE TO RELATED APPLICATIONS

The present application is a 35 U.S.C. §§371 national phase conversion of PCT/EP2011/061655, filed Jul. 8, 2011, the contents of which are incorporated by reference herein. The PCT International Application was published in the German language.

FIELD OF THE INVENTION

The invention relates to a protective layer for protecting a component against corrosion and/or oxidation in particular at high temperatures.

TECHNICAL BACKGROUND

The invention relates to a protective layer for protecting a component against corrosion and/or oxidation in particular at high temperatures as claimed in claim 1.

Numerous protective layers for metallic components that are supposed to increase the corrosion resistance and/or oxidation resistance of said components are known from the prior art. Most of these protective layers are known under the collective name MCrAlY, where M stands for at least one of the elements selected from the group consisting of iron, cobalt and nickel and further essential constituents are chromium, aluminum and yttrium.

Typical coatings of this type are known from U.S. Pat. Nos. 4,005,989 and 4,034,142.

The addition of rhenium (Re) to NiCoCrAlY alloys is also known.

The objective of increasing the inlet temperatures of both stationary gas turbines and aircraft engines is of considerable significance in the specialist field of gas turbines, since the inlet temperatures are important variables determining the thermodynamic efficiencies which can be achieved by gas turbines. The use of specially developed alloys as base materials for components which are to be exposed to high thermal stresses, such as guide vanes and rotor blades, and in particular the use of single-crystal superalloys, allows the use of inlet temperatures of well over 1000° C. Nowadays, the prior art permits inlet temperatures of 950° C. and above in the case of stationary gas turbines and 1100° C. and above in the case of gas turbines for aircraft engines.

Examples of the structure of a turbine blade or vane having a single-crystal substrate, which for its part may be of complex structure, are revealed by WO 91/01433 A1.

Whereas the physical load-bearing capacity of the base materials which have by now been developed for the highly stressed components does not present any major problems with a view to possible further increases in the inlet temperatures, protective layers have to be employed to achieve sufficient resistance to oxidation and corrosion. In addition to the sufficient chemical stability of a protective layer under the attacks expected from flue gases at temperatures of the order of magnitude of 1000° C., a protective layer also has to have sufficiently good mechanical properties, not least with a view to the mechanical interaction between the protective layer and the base material. In particular, the protective layer must be sufficiently ductile to enable any deformation of the base material to be followed and not to crack, since points of attack for oxidation and corrosion would be created in this way.

SUMMARY OF THE INVENTION

Accordingly, the invention is based on the object of providing an alloy and a protective layer which has a good high-temperature stability with regard to corrosion and oxidation, good long-term stability and, moreover, is particularly well matched to mechanical stresses which are expected at a high temperature in particular in a gas turbine.

The object is achieved by a layer system,
at least comprising:
a substrate,
an at least two-layered metallic layer
consisting of at least a first bottom layer and
a second top layer on the bottom layer,
wherein the bottom layer
comprises an MCrAlX alloy
without tantalum (Ta) and without silicon (Si) and without iron (Fe),
in particular contains at least the following elements,
very particularly consists thereof:
(amounts in % by weight):
24%-26% cobalt (Co),
in particular 25%,
12%-14% chromium (Cr),
in particular 13%,
10%-12% aluminum (Al),
in particular 11%,
0.2%-0.5%,
very particularly 0.3%,
nickel,
in particular remainder nickel,
wherein the second layer comprises an MCrAlX alloy,
either with tantalum (Ta) and/or iron (Fe)
or with the γ and the γ' phase and optionally the β phase,
where X is optional and is at least one of the elements from the group comprising scandium, rhenium and the rare earth elements,
in particular yttrium (Y).
Further advantages are achieved by:
the alloy of the bottom layer consisting of cobalt (Co), chromium (Cr), aluminum (Al), yttrium (Y) and nickel (Ni)
the content of tantalum (Ta) in the alloy of the top layer is between 0.1% by weight and 7.0% by weight, in particular is ≥1% by weight
the proportion of tantalum (Ta) in the alloy of the top layer is at least 2.0% by weight, in particular is between 3.0% by weight and 6.0% by weight
the proportion of tantalum (Ta) in the alloy of the top layer is between 4% by weight and 8% by weight, in particular is 5% by weight—7% by weight, very particularly is 6% by weight
the content of cobalt (Co) in the alloy of the top layer is at least 1% by weight
the alloy of the top layer comprises at least 1% by weight chromium (Cr)
the alloy of the bottom layer comprises no rhenium (Re)
the content of aluminum (Al) in the alloy of the top layer is between 5% by weight—15% by weight, in particular is between 8% by weight—12% by weight
the alloy of the top layer comprises no rhenium (Re)
the following holds true for the alloys of the metallic layers:
not containing zirconium (Zr) and/or not containing titanium (Ti) and/or
not containing gallium (Ga) and/or
not containing germanium (Ge)
the alloy of the bottom layer and/or of the top layer contains no silicon (Si)
the respective alloy of the layers comprises no hafnium (Hf)
the alloy of the top layer is nickel-based
the alloy of the bottom layer is nickel-based
the top layer comprises the γ phase, the γ' phase and optionally the β phase, in particular also comprises the β phase
the alloy of the top layer comprises at least 1% by weight aluminum (Al)
the alloy of the top layer (10) comprises at least 0.1% by weight, in particular comprises 0.3% by weight, in particular comprises between 0.1% by weight and 0.7% by weight, yttrium (Y)
the content of cobalt (Co) in the alloy of the top layer is between 15% by weight—30% by weight,
in particular is 18% by weight—27% by weight,
very particularly is between 21% by weight—24% by weight
the content of chromium (Cr) in the alloy of the top layer is between 12% by weight—22% by weight,
in particular is between 15% by weight—19% by weight
the top layer contains the β phase,
in particular at least 5% by volume
the top layer comprises an alloy consisting of nickel (Ni), cobalt (Co), aluminum (Al), chromium (Cr), tantalum (Ta) and optionally yttrium (Y),
in particular consists thereof
the top layer comprises an alloy consisting of nickel (Ni), cobalt (Co), aluminum (Al), chromium (Cr), tantalum (Ta), iron (Fe) and optionally yttrium (Y), in particular consists thereof
the top layer comprises an alloy consisting of nickel (Ni), cobalt (Co), aluminum (Al), chromium (Cr), tantalum (Ta) and yttrium (Y), in particular consists thereof
the top layer comprises an alloy consisting of nickel (Ni), cobalt (Co), aluminum (Al), chromium (Cr), tantalum (Ta), iron (Fe) and yttrium (Y),
in particular consists thereof
the alloy of the layers (7, 10) comprises no iron (Fe)
the proportion of iron (Fe) in the alloy of the top layer is between 0.5% by weight—5.0% by weight,
in particular is between 1.0% by weight—4.0% by weight, and
very particularly is 2.7% by weight
the content of chromium (Cr) in the alloy of the top layer is between 12% by weight—16% by weight,
in particular is 14.4% by weight
the proportion of aluminum (Al) in the alloy of the top layer is between 7% by weight—8% by weight,
in particular is 7.75% by weight
the proportion of rhenium (Re) in the alloy of the top layer is 0.1% by weight—2% by weight
the content of tantalum (Ta) in the alloy of the top layer is between 5% by weight and 6.8% by weight
the alloy of the metallic layers contains no platinum (Pt)
the content of cobalt (Co) in the alloy of the top layer is between 11% by weight—14.5% by weight
the content of chromium (Cr) in the alloy of the top layer is between 14% by weight—16% by weight
the content of aluminum (Al) in the alloy of the top layer is between 9% by weight—13% by weight
the content of yttrium (Y) in the alloy of the top layer is between 0.1% by weight—0.7% by weight
the alloy of the top layer comprises between 4% by weight and 7.5% by weight, in particular comprises between 3.0% by weight and 6.0% by weight, tantalum (Ta)
the content of tantalum (Ta) in the alloy of the top layer is between 3.5% by weight and 5.5% by weight,
in particular is 4.5% by weight
the content of cobalt (Co) in the alloy of the top layer is between 21% by weight—25% by weight,
in particular is between 22% by weight—23.5% by weight,
very particularly is 23% by weight
the content of chromium (Cr) in the alloy of the top layer is between 18% by weight—22% by weight
the top layer comprises no yttrium (Y)
the content of aluminum (Al) in the alloy of the top layer is between 8% by weight—12% by weight
the content of yttrium (Y) in the alloy of the top layer is between 0.1% by weight—0.7% by weight These measures listed above can be combined with one another as desired in order to achieve further advantages.

DESCRIPTION OF EMBODIMENTS

The figures and the description represent only exemplary embodiments of the invention.

According to the invention, the layer system 1, 120, 130, 155 (FIG. 1) for protecting a component comprising a substrate 4 against corrosion and oxidation at a high temperature comprises the following:
a two-layered metallic layer 7, 10
consisting of at least a first bottom layer 7 and a second top layer 10,
wherein the bottom layer 7
comprises an MCrAl alloy without tantalum (Ta) and without silicon (Si) and without iron (Fe), and
in particular contains the following elements,
(amounts in % by weight):
24%-26% cobalt (Co),
in particular 25%,
12%-14% chromium (Cr),
in particular 13%,
10%-12% aluminum (Al),
in particular 11%,
0.2%-0.5%,
very particularly 0.3%,
of at least one element from the group comprising scandium and the rare earth elements, in particular yttrium (Y),
nickel,
in particular remainder nickel,
wherein the second layer 10 comprises an MCrAl alloy, either with tantalum (Ta) and/or iron (Fe) or with the γ and the γ' phase and optionally the β phase.

The protective layer 13 has good corrosion resistance combined with particularly good resistance to oxidation, and is also distinguished by particularly good ductility properties, and therefore it is particularly well qualified for use in a gas turbine 100 (FIG. 3) with a further increase in the inlet temperature.

Figure 1:
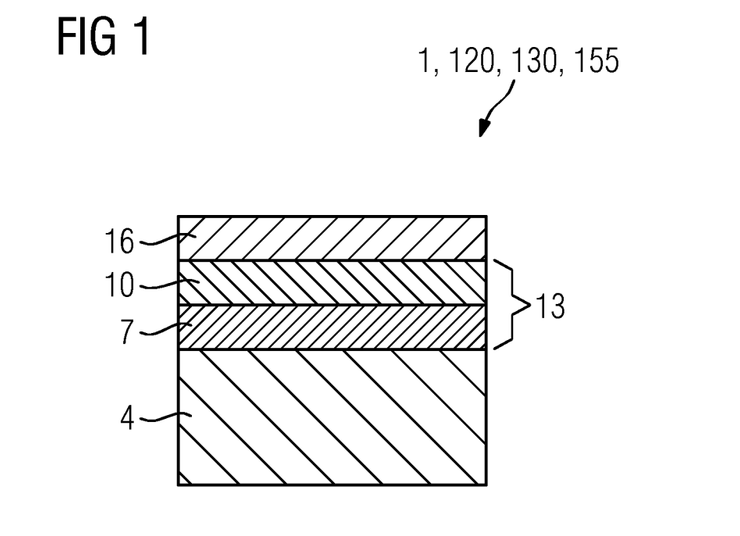
FIG. 1 shows a layer system having a protective layer.

The protective layer 13 has a bottom MCrAlX layer 7 and an outer layer 10, which 10 comprises an MCrAlX alloy containing tantalum (Ta) and/or iron (Fe). X is optional and is preferably scandium or selected from the group of the rare earth elements, in particular yttrium and/or rhenium.

Rhenium (Re), which is often used, can be dispensed with in the bottom layer 7, so that no brittle rhenium phases which might reduce the ductility of the bottom layer 7 form.

The bottom layer 7 is preferably a pure NiCoCrAl layer, i.e. without additions of tantalum and/or iron, the outer layer 10 comprising additions such as tantalum and/or iron for setting phases or phase transition for good oxidation protection.

Figure 2:
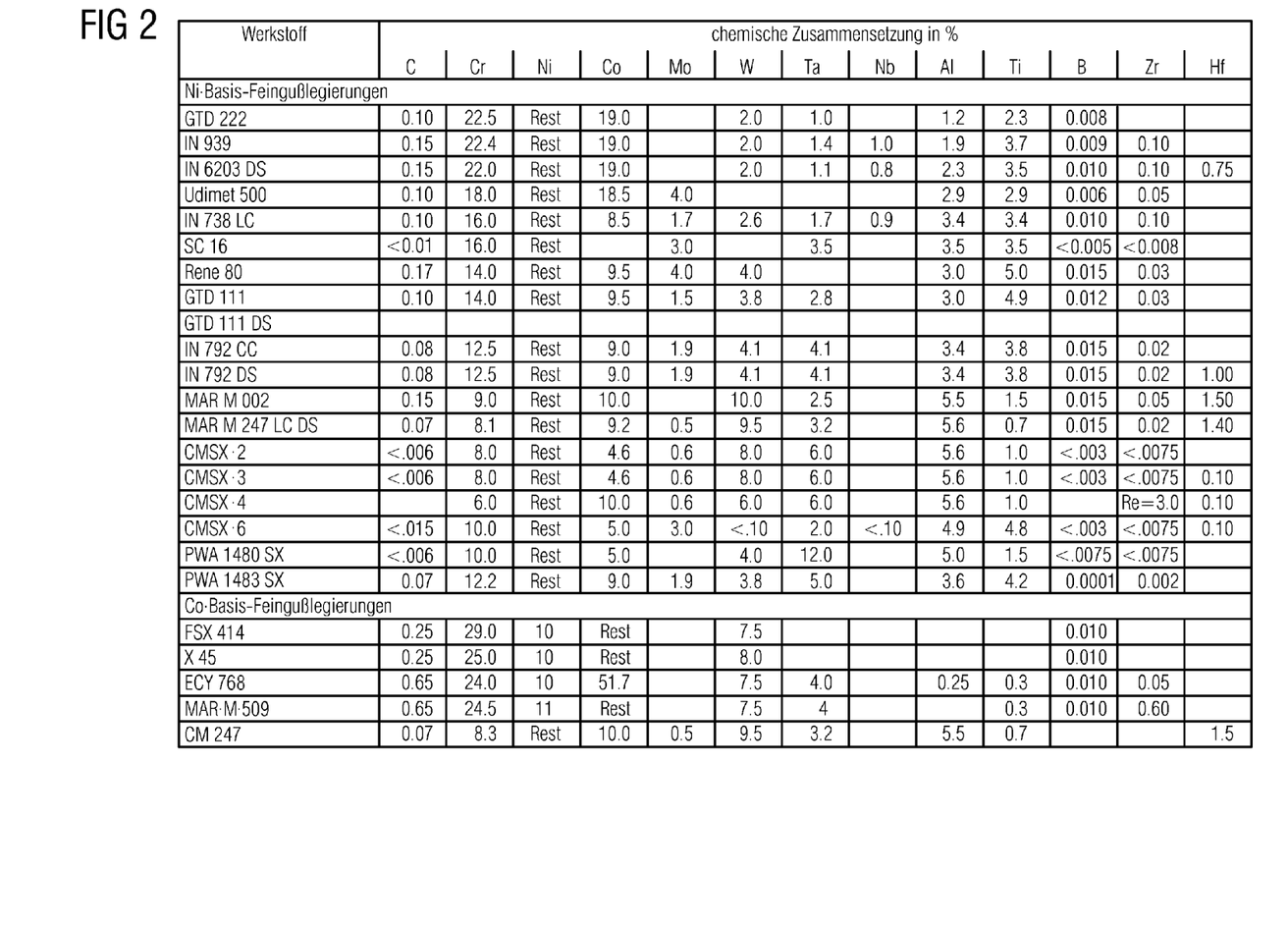
FIG. 2 shows compositions of superalloys.

The bottom layer 7 preferably has a relatively narrow composition and is adapted to nickel or cobalt superalloys, in particular as shown in FIG. 2, or for identical extension and good adhesion. The ductility thereof is pronounced to a considerably higher extent, at least 10%, in particular 20%, than that of the outer metallic layer 10.

Therefore, the outer layer 10 can be configured in an extremely variable manner, considerably more independently of the composition of the substrate (4) and depending on the use, without compromise: high operating temperature (with rapid oxide growth) or average temperatures and long oxidation protection:

Ni-13Co-15Cr-11Al (4.5-6)Ta, −0.3 Y

Ni—Co—Cr—Al—Fe.

The outer layer 10 has outstanding oxidation protection, the bottom layer by contrast having a very high toughness and thus protecting the substrate 4, which can then be reused without defects for a new use.

The powders are applied, for example, by plasma spraying (APS, LPPS, VPS, . . . ). Other processes are also conceivable (PVD, CVD, cold spraying, . . . ).

The protective layer 13 described also acts as a bonding layer to a superalloy.

Further layers, in particular ceramic thermal barrier coatings 16, can be applied to this protective layer 7.

In the case of a component 1, 120, 130, the protective layer 13 is advantageously applied to a substrate 4 made from a nickel-based or cobalt-based superalloy, in particular as shown in FIG. 2.

Compositions of this type are known as casting alloys under the names GTD222, IN939, IN6203 and Udimet 500.

Further alternatives for the substrate 4 of the component 1, 120, 130, 155 are listed in FIG. 2.

The thickness of the protective layer 13 on the component 1 is preferably between approximately 100 µm and 300 µm.

The protective layer 13 is particularly suitable for protecting the component 1, 120, 130, 155 against corrosion and oxidation when the component is exposed to a flue gas at a material temperature of around 950° C., and in the case of aircraft turbines even around 1100° C.

Figure 3:
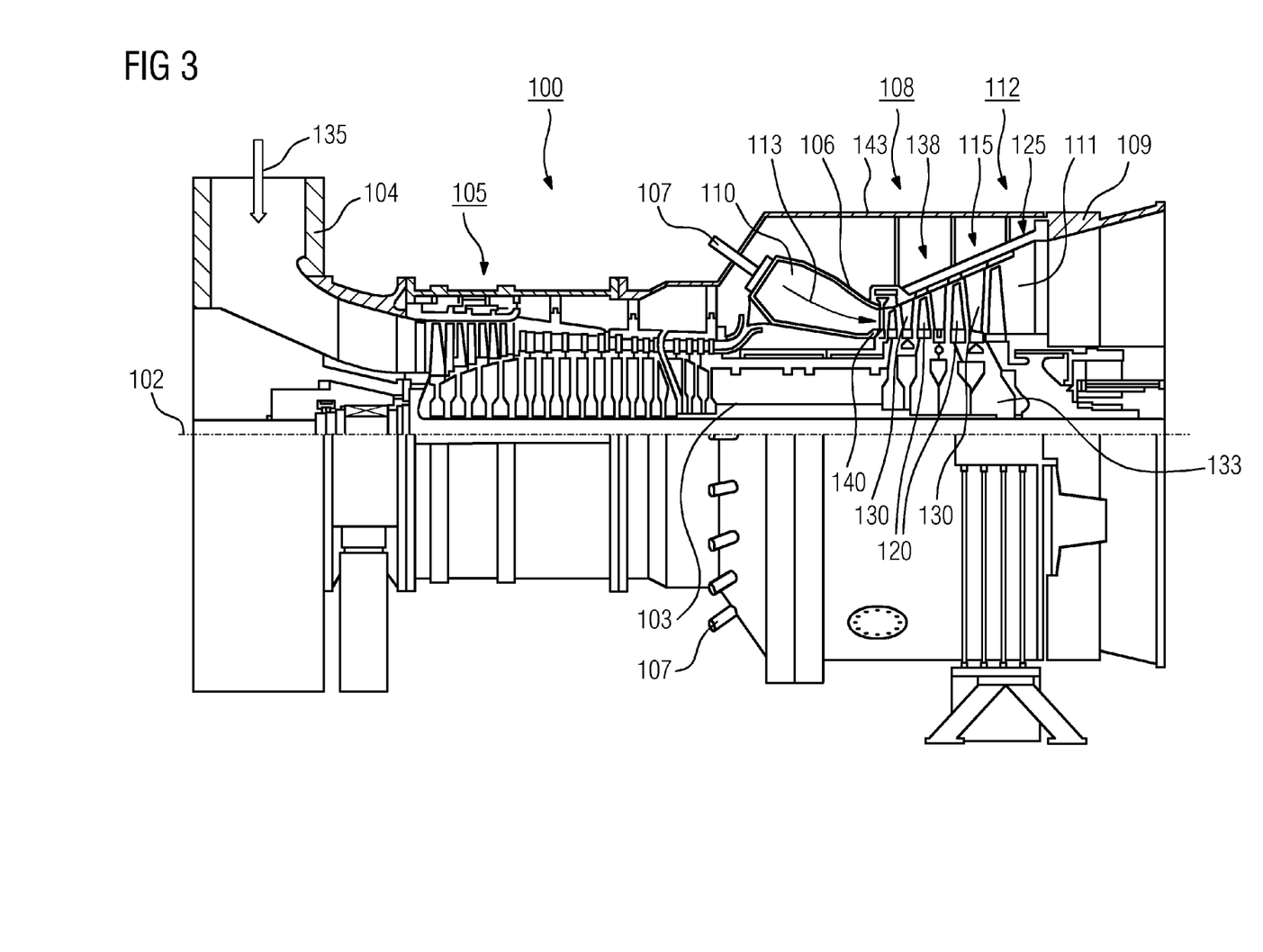
FIG. 3 shows a gas turbine.

The protective layer 13 according to the invention is therefore particularly well qualified for protecting a component of a gas turbine 100, in particular a guide vane 120, a rotor blade 130 or a heat shield element 155, which is exposed to hot gas upstream of or in the turbine of the gas turbine 100 or of the steam turbine.

The protective layer 13 can be used as an overlay (the protective layer is the outer layer) or as a bond coat (the protective layer is an interlayer).

FIG. 1 shows a layer system 1 as a component.

The layer system 1 comprises a substrate 4.

The substrate 4 may be metallic and/or ceramic. In particular in the case of turbine components, such as for example turbine rotor blades 120 (FIG. 4) or turbine guide vanes 130 (FIGS. 3, 4), heat shield elements 155 (FIG. 5) and other housing parts of a steam or gas turbine 100 (FIG. 3), the substrate 4 comprises a nickel-based or cobalt-based superalloy, in particular consists thereof.

It is preferable to use nickel-based superalloys.

The protective layer 13 according to the invention is present on the substrate 4.

It is preferable for this protective layer 13 to be applied by plasma spraying (VPS, LPPS, APS, . . . ).

It can be used as the outer layer (not shown) or as the interlayer (FIG. 1).

In the latter case, a ceramic thermal barrier coating 16 is present on the protective layer 13.

An aluminum oxide layer forms on the metallic layer 13 during operation and/or during the application of the ceramic coating 16.

The protective layer 13 can be applied to newly produced components and refurbished components.

Refurbishment means that after they have been used, layers (thermal barrier coating) may have to be detached from components 1 and corrosion and oxidation products removed, for example by an acid treatment (acid stripping). If appropriate, cracks also have to be repaired. This can be followed by recoating of a component of this type, since the substrate 4 is very expensive.

FIG. 3 shows by way of example a partial longitudinal section through a gas turbine 100.

In its interior, the gas turbine 100 has a rotor 103 which is mounted such that it can rotate about an axis of rotation 102, has a shaft 101, and is also referred to as the turbine rotor. An intake housing 104, a compressor 105, a for example toroidal combustion chamber 110, in particular an annular combustion chamber, with a plurality of coaxially arranged burners 107, a turbine 108 and the exhaust gas housing 109 follow one another along the rotor 103.

The annular combustion chamber 110 is in communication with a for example annular hot gas duct 111. There, by way of example, four successive turbine stages 112 form the turbine 108.

Each turbine stage 112 is formed for example from two blade or vane rings. As seen in the direction of flow of a working medium 113, a guide vane row 115 is followed in the hot gas duct 111 by a row 125 formed from rotor blades 120.

The guide vanes 130 are secured to an inner housing 138 of a stator 143, whereas the rotor blades 120 belonging to a row 125 are arranged on the rotor 103, for example by means of a turbine disk 133. A generator (not shown) is coupled to the rotor 103.

While the gas turbine 100 is operating, air 135 is drawn in through the intake housing 104 and compressed by the compressor 105. The compressed air provided at the turbine end of the compressor 105 is passed to the burners 107, where it is mixed with a fuel. The mixture is then burnt in the combustion chamber 110, forming the working medium 113. From there, the working medium 113 flows along the hot gas duct 111 past the guide vanes 130 and the rotor blades 120. The working medium 113 is expanded at the rotor blades 120, transferring its momentum, so that the rotor blades 120 drive the rotor 103 and the latter in turn drives the generator coupled to it.

While the gas turbine 100 is operating, the components which are exposed to the hot working medium 113 are subject to thermal stresses. The guide vanes 130 and rotor blades 120 of the first turbine stage 112, as seen in the direction of flow of the working medium 113, together with the heat shield elements which line the annular combustion chamber 110, are subject to the highest thermal stresses.

To be able to withstand the temperatures which prevail there, they can be cooled by means of a coolant.

Substrates of the components may likewise have a directional structure, i.e. they are in single-crystal form (SX structure) or have only longitudinally oriented grains (DS structure).

By way of example, iron-based, nickel-based or cobalt-based superalloys are used as material for the components, in particular for the turbine blade or vane 120, 130 and components of the combustion chamber 110.

Superalloys of this type are known for example from EP 1 204 776 B1, EP 1 306 454, EP 1 319 729 A1, WO 99/67435 or WO 00/44949.

The guide vane 130 has a guide vane root (not shown here) facing the inner housing 138 of the turbine 108 and a guide vane head at the opposite end from the guide vane root. The guide vane head faces the rotor 103 and is fixed to a securing ring 140 of the stator 143.

Figure 4:
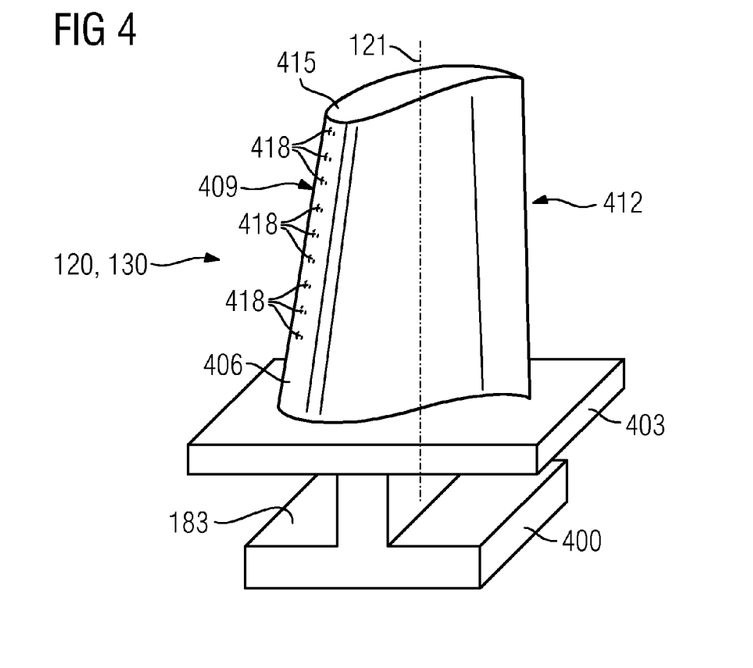
FIG. 4 shows a turbine blade or vane.

FIG. 4 shows a perspective view of a rotor blade 120 or guide vane 130 of a turbomachine, which extends along a longitudinal axis 121.

The turbomachine may be a gas turbine of an aircraft or of a power plant for generating electricity, a steam turbine or a compressor.

The blade or vane 120, 130 has, in succession along the longitudinal axis 121, a securing region 400, an adjoining blade or vane platform 403, a main blade or vane part 406 and a blade or vane tip 415.

As a guide vane 130, the vane 130 may have a further platform (not shown) at its vane tip 415.

A blade or vane root 183, which is used to secure the rotor blades 120, 130 to a shaft or a disk (not shown), is formed in the securing region 400.

The blade or vane root 183 is designed, for example, in hammerhead form. Other configurations, such as a fir-tree or dovetail root, are possible.

The blade or vane 120, 130 has a leading edge 409 and a trailing edge 412 for a medium which flows past the main blade or vane part 406.

In the case of conventional blades or vanes 120, 130, by way of example solid metallic materials, in particular superalloys, are used in all regions 400, 403, 406 of the blade or vane 120, 130.

Superalloys of this type are known, for example, from EP 1 204 776 B1, EP 1 306 454, EP 1 319 729 A1, WO 99/67435 or WO 00/44949.

The blade or vane 120, 130 may in this case be produced by a casting process, also by means of directional solidification, by a forging process, by a milling process or combinations thereof.

Workpieces with a single-crystal structure or structures are used as components for machines which, in operation, are exposed to high mechanical, thermal and/or chemical stresses. Single-crystal workpieces of this type are produced, for example, by directional solidification from the melt. This involves casting processes in which the liquid metallic alloy solidifies to form the single-crystal structure, i.e. the single-crystal workpiece, or solidifies directionally.

In this case, dendritic crystals are oriented along the direction of heat flow and form either a columnar crystalline grain structure (i.e. grains which run over the entire length of the workpiece and are referred to here, in accordance with the language customarily used, as directionally solidified) or a single-crystal structure, i.e. the entire workpiece consists of one single crystal. In these processes, a transition to globular (polycrystalline) solidification needs to be avoided, since non-directional growth inevitably forms transverse and longitudinal grain boundaries, which negate the favorable properties of the directionally solidified or single-crystal component.

Where the text refers in general terms to directionally solidified microstructures, this is to be understood as meaning both single crystals, which do not have any grain boundaries or at most have small-angle grain boundaries, and columnar crystal structures, which do have grain boundaries running in the longitudinal direction but do not have any transverse grain boundaries. This second form of crystalline structure is also described as directionally solidified microstructures (directionally solidified structures). described as directionally solidified microstructures (directionally solidified structures).

Processes of this type are known from U.S. Pat. No. 6,024,792 and EP 0 892 090 A1.

The blades or vanes 120, 130 may likewise have protective layers 7 according to the invention protecting against corrosion or oxidation.

The density is preferably 95% of the theoretical density. A protective aluminum oxide layer (TGO=thermally grown oxide layer) is formed on the MCrAlX layer (as an interlayer or as the outermost layer).

It is also possible for a thermal barrier coating, which is preferably the outermost layer and consists for example of $ZrO_2$, $Y_2O_3$—$ZrO_2$, i.e. unstabilized, partially stabilized or fully stabilized by yttrium oxide and/or calcium oxide and/or magnesium oxide, to be present on the MCrAlX.

The thermal barrier coating covers the entire MCrAlX layer. Columnar grains are produced in the thermal barrier coating by means of suitable coating processes, such as for example electron beam physical vapor deposition (EB-PVD).

Other coating processes are conceivable, for example atmospheric plasma spraying (APS), LPPS, VPS or CVD. The thermal barrier coating may have grains that are porous and/or include micro-cracks or macro-cracks in order to improve the resistance to thermal shocks. Therefore, the thermal barrier coating is preferably more porous than the MCrAlX layer.

The blade or vane 120, 130 may be hollow or solid in form. If the blade or vane 120, 130 is to be cooled, it is hollow and may also have film-cooling holes 418 (indicated by dashed lines).

Figure 5:
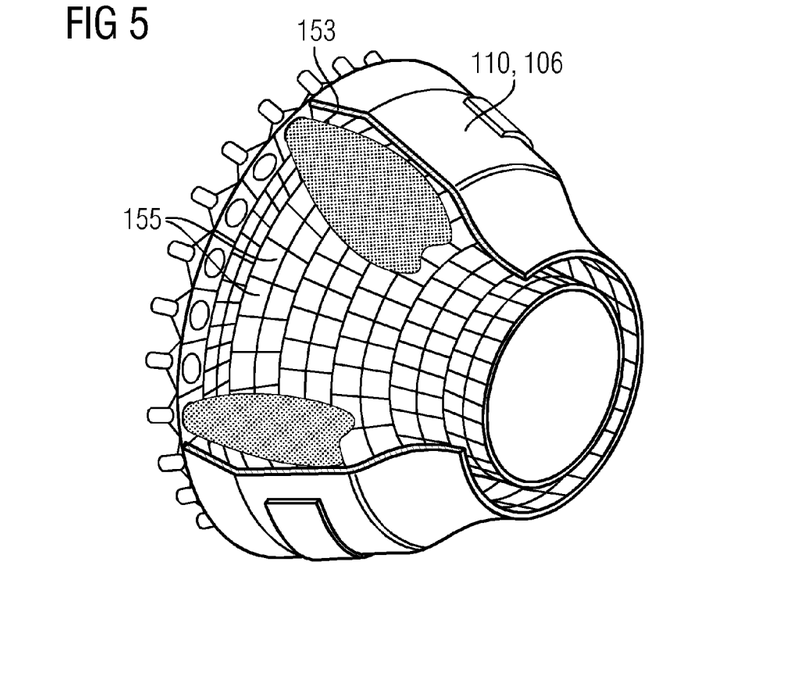
FIG. 5 shows a combustion chamber.

FIG. 5 shows a combustion chamber 110 of the gas turbine 100. The combustion chamber 110 is configured, for example, as what is known as an annular combustion chamber, in which a multiplicity of burners 107, which generate flames 156 and are arranged circumferentially around an axis of rotation 102, open out into a common combustion chamber space 154. For this purpose, the combustion chamber 110 overall is of annular configuration positioned around the axis of rotation 102.

To achieve a relatively high efficiency, the combustion chamber 110 is designed for a relatively high temperature of the working medium M of approximately 1000° C. to 1600° C. To allow a relatively long service life even with these operating parameters, which are unfavorable for the materials, the combustion chamber wall 153 is provided, on its side which faces the working medium M, with an inner lining formed from heat shield elements 155.

A cooling system may also be provided for the heat shield elements 155 and/or their holding elements, on account of the high temperatures in the interior of the combustion chamber 110. The heat shield elements 155 are then for example hollow and may also have cooling holes (not shown) which open out into the combustion chamber space 154.

On the working medium side, each heat shield element 155 made from an alloy is equipped with a particularly heat-resistant protective layer (MCrAlX layer and/or ceramic coating) or is made from material that is able to withstand high temperatures (solid ceramic bricks).

These protective layers 7 may be similar to those used for the turbine blades or vanes.

A for example ceramic thermal barrier coating, consisting for example of $ZrO_2$, $Y_2O_3$—$ZrO_2$, i.e. unstabilized, partially stabilized or fully stabilized by yttrium oxide and/or calcium oxide and/or magnesium oxide, may also be present on the MCrAlX.

Columnar grains are produced in the thermal barrier coating by suitable coating processes, such as for example electron beam physical vapor deposition (EB-PVD).

Other coating processes are conceivable, for example atmospheric plasma spraying (APS), LPPS, VPS or CVD. The thermal
barrier coating may have grains that are porous and/or include micro-cracks or macro-cracks in order to improve the resistance to thermal shocks.

Refurbishment means that after they have been used, protective layers may have to be removed from turbine blades or vanes 120, 130, heat shield elements 155 (e.g. by sand-blasting). Then, the corrosion and/or oxidation layers and products are removed. If appropriate, cracks in the turbine blade or vane 120, 130 or the heat shield element 155 are also repaired. This is followed by recoating of the turbine blades or vanes 120, 130, heat shield elements 155, after which the turbine blades or vanes 120, 130 or the heat shield elements 155 can be reused.

The invention claimed is:

1. A layer system at least comprising:
a substrate,
an at least two-layered metallic layer comprised of at least a first bottom layer on the substrate and a second top layer on the bottom layer,
wherein the first bottom layer comprises:
a first alloy comprising at least MCrAl, the first alloy optionally including $X_1$, M being at least one of the elements selected from the group consisting of iron, cobalt, and nickel, the first alloy being without tantalum (Ta) and without silicon (Si) and without iron (Fe), and containing at least the following elements, in amounts in percentages by weight:
24%-26% cobalt (Co),
12%-14% chromium (Cr),
5%-15% aluminum (Al),
and a remainder of nickel, and
wherein the second top layer comprises a second alloy comprising at least MCrAl, the second alloy optionally including $X_2$, M being at least one of the elements selected from the group consisting of iron, cobalt, and nickel, the alloy including at least one of tantalum (Ta) and iron (Fe), where $X_1$, in the first alloy of the first bottom layer, and $X_2$, in the second alloy of the second top layer, are independently at least one element selected from the group of elements consisting of: scandium (Sc), rhenium (Re), yttrium (Y), and any of the rare earth group elements other than yttrium (Y), the first alloy including 0.2%45% by weight in total of the at least one element selected from the group of elements, when $X_1$ is included in the first alloy.

2. The layer system as claimed in claim 1, in which the first alloy of the first bottom layer comprises cobalt (Co), chromium (Cr), aluminum (Al), yttrium (Y) and nickel (Ni).

3. The layer system as claimed in claim 1, in which the content of tantalum (Ta) in the second alloy of the second top layer is between 0.1% by weight and 7.0% by weight.

4. The layer system as claimed in claim 1, in which the content of cobalt (Co) in the second alloy of the second top layer is at least 1% by weight.

5. The layer system as claimed in claim 1, in which the second alloy of the second top layer comprises at least 1% by weight chromium (Cr).

6. The layer system as claimed in claim 1, in which the first alloy of the first bottom layer comprises no rhenium (Re).

7. The layer system as claimed in claim 1, in which the second alloy of the second top layer comprises no rhenium (Re).

8. The layer system as claimed in claim 1, in which at least one of: (1) the first alloy of the first bottom layer and (2) the second alloy of the second top layer contains no silicon (Si).

9. The layer system as claimed in claim 1, in which the second alloy of the second top layer is nickel-based.

10. The layer system as claimed in claim 1, in which the first alloy of the first bottom layer is nickel-based.

11. The layer system as claimed in claim 1, in which the second alloy of the second top layer comprises at least 1% by weight aluminum (Al).

12. The layer system as claimed in claim 11, in which the content of aluminum (Al) in the second alloy of the second top layer is between 8% by weight and 12% by weight.

13. The layer system as claimed in claim 1, in which the second alloy of the second top layer comprises at least 0.1% by weight of yttrium (Y).

14. The layer system as claimed in claim 1, in which the content of cobalt (Co) in the second alloy of the second top layer is between 15% by weight and 30% by weight.

15. The layer system as claimed in claim 1, in which the content of chromium (Cr) in the second alloy of the second top layer is between 12% by weight and 22% by weight.

16. The layer system as claimed in claim 1, in which the second alloy of the second top layer comprises nickel (Ni), cobalt (Co), aluminum (Al), chromium (Cr), tantalum (Ta) and optionally yttrium (Y).

17. The layer system as claimed in claim 1, in which the second alloy of the second top layer comprises nickel (Ni), cobalt (Co), aluminum (Al), chromium (Cr), tantalum (Ta) and yttrium (Y).

18. The layer system as claimed in claim 1, in which the second alloy of the second top layer comprises nickel (Ni), cobalt (Co), aluminum (Al), chromium (Cr), tantalum (Ta), iron (Fe) and optionally yttrium (Y).

19. The layer system as claimed in claim 1, in which the second alloy of the second top layer comprises nickel (Ni), cobalt (Co), aluminum (Al), chromium (Cr), tantalum (Ta), iron (Fe) and yttrium (Y).

20. The layer system as claimed in claim 1, wherein the first alloy of the first bottom layer and the second alloy of the second top layer comprises no iron (Fe).

21. The layer system as claimed in claim 1, in which the proportion of iron (Fe) in the second alloy of the second top layer is between 0.5% by weight and 5.0% by weight.

22. The layer system as claimed in claim 1, in which the proportion of aluminum (Al) in the second alloy of the second top layer is between 7% by weight and 8% by weight.

23. The layer system as claimed in claim 1, in which the second alloy of the second top layer comprises between 0.1% by weight and 2% by weight of rhenium (Re).

24. The layer system as claimed in claim 1, in which the content of tantalum (Ta) in the second alloy of the second top layer is between 5% by weight and 6.8% by weight.

25. The layer system as claimed in claim 1, in which the content of cobalt (Co) in the second alloy of the second top layer is between 11.0% by weight and 14.5% by weight.

26. The layer system as claimed in claim 1, in which the second alloy of the second top layer comprises between 0.1% by weight and 0.7% by weight of yttrium (Y).

27. The layer system as claimed in claim 1, in which the second alloy of the second top layer is between 4% by weight and 7.5% by weight of tantalum (Ta).

28. The layer system as claimed in claim 1, in which the content of chromium (Cr) in the second alloy of the second top layer is between 18% by weight and 22% by weight.

29. The layer system as claimed in claim 1, in which the second alloy of the second top layer comprises no yttrium (Y).

30. The layer system as claimed in claim 1, which is a component of a gas turbine, in which a substrate of the layer system is nickel-based or cobalt-based, and in which a ceramic thermal barrier coating is applied to the second top layer.

* * * * *